(12) United States Patent
Hunter et al.

(10) Patent No.: US 10,214,284 B2
(45) Date of Patent: Feb. 26, 2019

(54) PITCH BEARING

(71) Applicant: Sikorsky Aircraft Corporation, Stratford, CT (US)

(72) Inventors: David H. Hunter, Cheshire, CT (US); Eric S. Parsons, New Haven, CT (US); Eric Lucien Nussenblatt, Stamford, CT (US); Ryan Thomas Casey, San Diego, CA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 202 days.

(21) Appl. No.: 14/041,674

(22) Filed: Sep. 30, 2013

(65) Prior Publication Data

US 2015/0093057 A1  Apr. 2, 2015

(51) Int. Cl.
| | | |
|---|---|---|
| *B64C 27/35* | (2006.01) |
| *F16F 1/393* | (2006.01) |
| *F16F 1/40* | (2006.01) |
| *B64C 27/48* | (2006.01) |

(52) U.S. Cl.
CPC .............. *B64C 27/35* (2013.01); *B64C 27/48* (2013.01); *F16F 1/393* (2013.01); *F16F 1/40* (2013.01)

(58) Field of Classification Search
CPC .. B64C 27/35; B64C 27/33; F16F 1/40; F16F 1/393; F16C 27/06
See application file for complete search history.

(56) References Cited

U.S. PATENT DOCUMENTS

| | | | | |
|---|---|---|---|---|
| 2,482,488 A | * | 9/1949 | Julien ..................... | B61F 5/325 267/292 |
| 2,996,311 A | * | 8/1961 | Thiry ....................... | B60G 7/00 280/124.104 |
| 3,652,185 A | * | 3/1972 | Cresap et al. ............ | 416/134 R |
| 3,790,302 A | * | 2/1974 | Pascher ..................... | 416/134 R |

(Continued)

FOREIGN PATENT DOCUMENTS

| | | |
|---|---|---|
| DE | 102005060490 A1 | 6/2007 |
| EP | 0187265 A1 | 7/1986 |
| GB | 2160619 A | 12/1985 |

OTHER PUBLICATIONS

International Search Report issued in PCT/US2014/058028 dated Dec. 30, 2015, 6 pages.

(Continued)

*Primary Examiner* — Xuan Lan Nguyen
(74) *Attorney, Agent, or Firm* — Cantor Colburn LLP

(57) ABSTRACT

A pitch bearing for connecting first and second articles is provided. The first article includes a first curved outer surface and the second article includes a second curved outer surface opposite the first curved outer surface. The pitch bearing includes an axisymmetric structure interposed between the first and second curved outer surfaces. The axisymmetric structure includes compliant layers and stabilizing layers interleaved between the compliant layers. The compliant layers and the stabilizing layers proximate to the first article haves a curvature matching that of the first curved outer surface. The compliant layers and the stabilizing layers proximate to the second article have a curvature matching that of the second curved outer surface. A shear stiffness of each of the stabilizing layers is greater than a shear stiffness of each of the compliant layers.

19 Claims, 6 Drawing Sheets

(56) References Cited

U.S. PATENT DOCUMENTS

| | | | |
|---|---|---|---|
| 4,142,833 A * | 3/1979 | Rybicki et al. | 416/134 A |
| 4,232,563 A | 11/1980 | Peterson et al. | |
| 4,419,398 A | 12/1983 | Coffy et al. | |
| 4,435,097 A * | 3/1984 | Peterson | 384/221 |
| 4,477,225 A * | 10/1984 | Burkam | 416/134 A |
| 4,676,669 A * | 6/1987 | Byrnes et al. | 384/221 |
| 4,765,758 A * | 8/1988 | O'Donnell et al. | 384/221 |
| 4,859,148 A * | 8/1989 | Hibyan | F16F 1/41 267/140.2 |
| 5,035,576 A | 7/1991 | Byrnes et al. | |
| 5,074,494 A | 12/1991 | Doolin et al. | |
| 5,092,738 A | 3/1992 | Byrnes et al. | |
| 5,110,259 A | 5/1992 | Robinson | |
| 5,186,686 A * | 2/1993 | Staples et al. | 464/69 |
| 5,188,513 A | 2/1993 | Byrnes | |
| 5,601,408 A | 2/1997 | Hunter et al. | |
| 5,842,687 A * | 12/1998 | David | F16F 1/3835 267/140.5 |
| 6,637,736 B2 * | 10/2003 | Eller et al. | 267/279 |
| 6,666,648 B2 | 12/2003 | Bernhard et al. | |
| 6,889,965 B2 | 5/2005 | Loftus et al. | |
| 6,971,853 B2 | 12/2005 | Chemouni et al. | |
| 6,995,583 B2 | 2/2006 | Culler | |
| 7,097,169 B2 | 8/2006 | Mueller | |
| 7,165,909 B2 * | 1/2007 | Buhl | F16F 1/3863 403/132 |
| 7,354,248 B2 | 4/2008 | Zinni | |
| 8,275,585 B2 | 9/2012 | Cunningham et al. | |
| 2009/0162201 A1 | 6/2009 | Cunningham | |
| 2011/0206303 A1 | 8/2011 | James | |

OTHER PUBLICATIONS

Written Opinion issued in PCT/US2014/058028 dated Dec. 30, 2014, 5 pages.

Extended European Search dated Apr. 6, 2017 in related EP Patent Application No. 14847515.5, 7 pages.

\* cited by examiner

PITCH BEARING

BACKGROUND OF THE INVENTION

The subject matter disclosed herein relates to a pitch bearing and, more particularly, to a reverse curvature compliant pitch bearing.

In current configurations of main rotors of helicopters or rotormachines, a significant percentage of the loads acting on the blades are transmitted to the central hub through elastomeric bearings. In addition to this load transference, these bearings allow the blades to pitch in response to pilot input through the various control systems on board. The magnitude of the loads acting on the bearings and the space constraints of the rotor configurations present a significant challenge to designing a set of bearings and a connecting block that have acceptable component lives.

BRIEF DESCRIPTION OF THE INVENTION

According to one aspect of the invention, a pitch bearing for connecting first and second articles is provided. The first article includes a first curved outer surface and the second article includes a second curved outer surface opposite the first curved outer surface. The pitch bearing includes an axisymmetric structure interposed between the first and second curved outer surfaces. The axisymmetric structure includes compliant layers and stabilizing layers interleaved between the compliant layers. The compliant layers and the stabilizing layers proximate to the first article haves a curvature matching that of the first curved outer surface. The compliant layers and the stabilizing layers proximate to the second article have a curvature matching that of the second curved outer surface. A shear stiffness of each of the stabilizing layers is greater than a shear stiffness of each of the compliant layers.

According to another aspect of the invention, a pitch bearing for connecting first and second articles is provided. The first article includes a first curved outer surface and the second article includes a second curved outer surface opposite the first curved outer surface. The pitch bearing includes an axisymmetric structure interposed between the first and second curved outer surfaces. The axisymmetric structure includes compliant layers and stabilizing layers interleaved between the compliant layers. The compliant layers and the stabilizing layers have a curvature matching that of the first and second curved outer surfaces. A shear stiffness of each of the stabilizing layers is greater than a shear stiffness of each of the compliant layers.

According to yet another aspect of the invention, a pitch bearing assembly is provided and includes a first article including first and second ends, the first article being rotatable with the first end proximate to a center of rotation and having a curved outer surface at the second end, a second article configured to be attached to the second end of the first article and having a curved outer surface and an axisymmetric structure interposed between the curved outer surfaces and including compliant layers and stabilizing layers interleaved between the compliant layers. The compliant layers and the stabilizing layers have respective curvatures matching that of the curved outer surfaces. A shear stiffness of each of the stabilizing layers is greater than a shear stiffness of each of the compliant layers.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
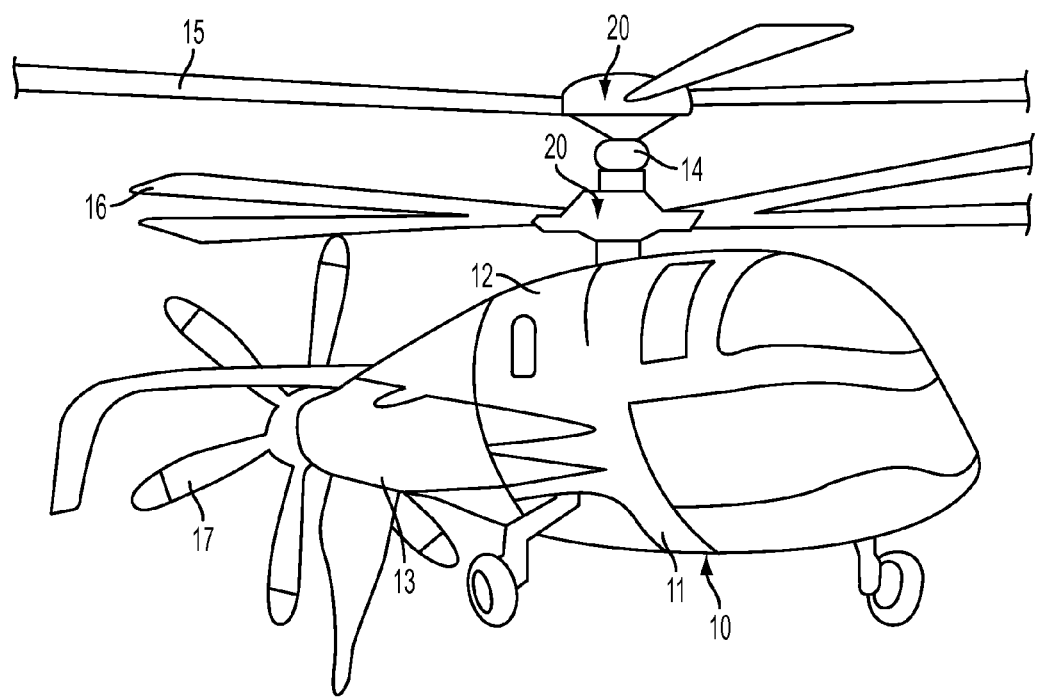
FIG. 1 is a perspective illustration of a rotormachine in accordance with embodiments.

With reference to FIG. 1, a rotormachine 10 is provided. The rotormachine 10 includes a fuselage 11 that is formed to define an interior cabin in which a pilot and passengers may be situated. The fuselage 11 includes a pylon section 12 at a top portion thereof and a tail section 13 at a trailing end thereof. The pylon section 12 is supportive of a main rotor shaft 14 that is rotatable about its longitudinal or vertical axis relative to the fuselage 11. The main rotor shaft 14 is respectively coupled to coaxial main rotor blades 15 and 16, which rotate with the main rotor shaft 14 to provide a lift force for the rotormachine 10. The tail section 13 is supportive of a propeller shaft (not shown) that is rotatable about a longitudinal axis thereof relative to the fuselage 11 and in a plane defined transversely with respect to a rotational plane of the main rotor shaft 14. The propeller shaft is coupled to a pusher propeller 17, which rotates with the propeller shaft, to provide thrust to the rotormachine 10. As illustrated, the rotormachine 10 is a compound or coaxial helicopter although it is to be understood that the illustration is merely exemplary and that the description provided herein may be applicable to various rotormachine and helicopter designs.

Figure 2:
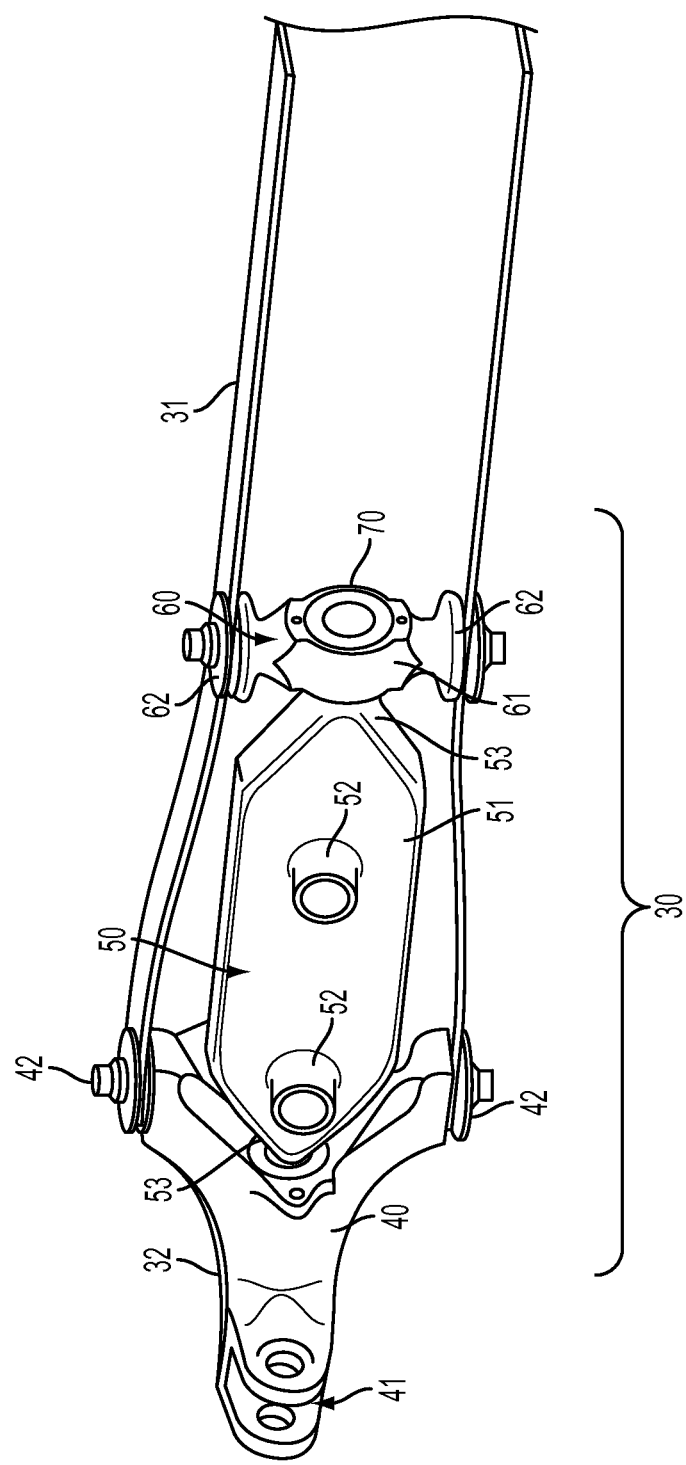
FIG. 2 is a perspective view of a pitch bearing assembly in accordance with embodiments.

With further reference to FIG. 1 and with additional reference to FIG. 2, it is to be understood that a significant percentage of the loads acting on the main rotor blades 15 and 16 are transmitted to the hub 20 (see FIG. 1) through a set of compliant pitch bearing assemblies 30. In accordance with the embodiments described herein, the pitch bearing assemblies 30 connect a composite torque tube 31 to a center block 32, which may be formed of titanium or another similar material and which may be bolted or otherwise fastened to the hub 20. The center block 32 includes a horn member 40, which has a first end 41 that may be bolted or otherwise fastened to a control system (not shown) and second end portions 42 that may be bolted or otherwise fastened to an end of the torque tube 31.

Each pitch bearing assembly 30 includes a first article 50, which may be formed of high strength steel (HSS) or titanium, a second article 60, which may be formed of titanium or another similar material, and a pitch bearing 70. The first article 50 includes a body 51 and bolt elements 52 that are fixable to the hub 20 by way of radial members (not shown). The body 51 may be formed as an elongate element with tapered ends 53. One of the tapered ends (i.e., a first tapered end) 53 connects with the center block 32 and is proximate to a center of rotation of the main rotor blades 15 and 16. The other tapered end (i.e., a second tapered end) 53 is attached to or otherwise connected with the second article 60. The second article 60 includes a body 61 and distal ends 62, which may be bolted or otherwise fastened to opposite sides of the torque tube 31. The second tapered end 53 extends through a central portion of the body 61 and is attached to or otherwise connected with the body 61 by way of the pitch bearing 70 as will be described below.

The pitch bearing assemblies 30 are configured to allow the main rotor blades 15 and 16 to pitch in response to pilot input through various control systems. Given that the pitch bearing assemblies 30 are able to transmit loads acting on the main rotor blades 15 and 16 to the hub 20 and still permit the main rotor blades 15 and 16 to pitch as required, the pitch bearing assemblies 30 are relatively small in size in accordance with the size requirements in effect.

Figure 3:
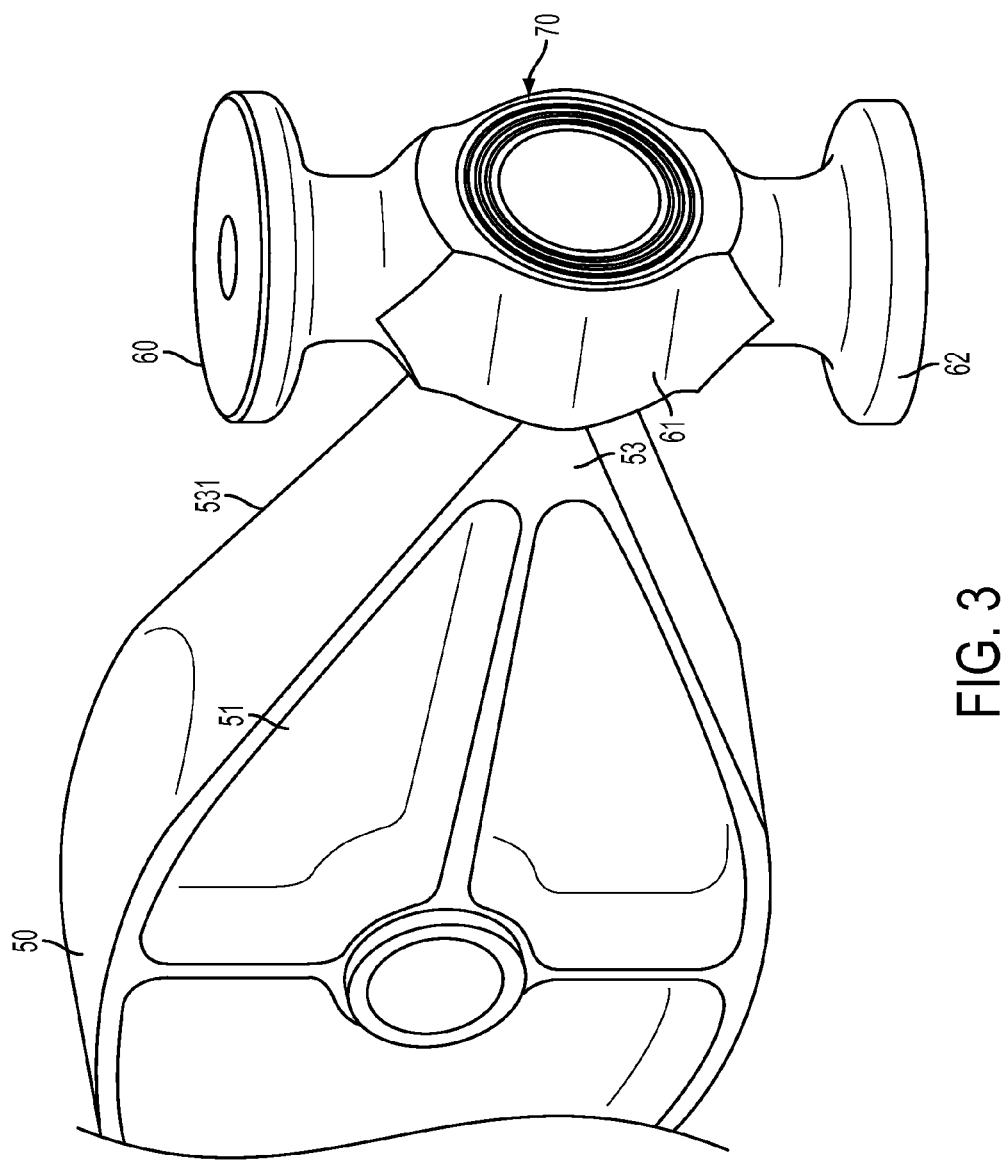
FIG. 3 is an enlarged perspective view of a pitch bearing of the pitch bearing assembly of FIG. 2 in accordance with embodiments.
Figure 4:
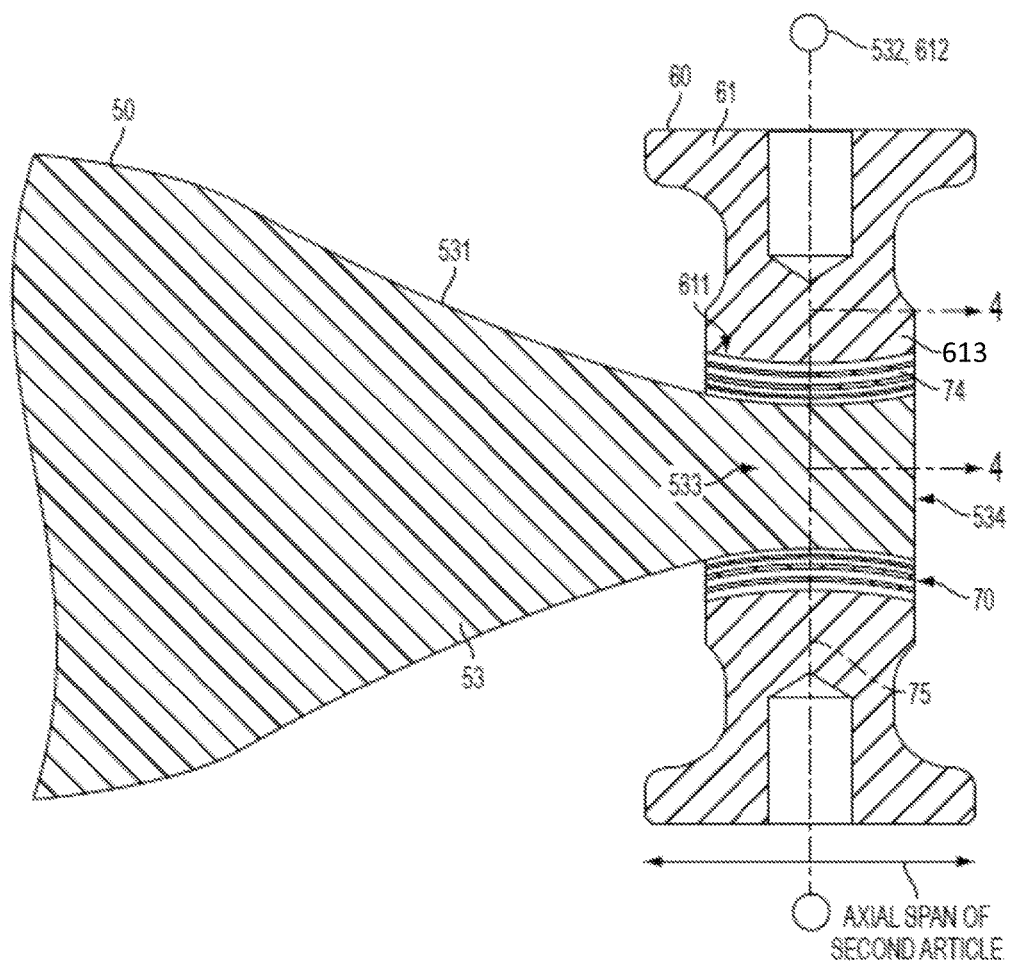
FIG. 4 is a cross-sectional side view of a pitch bearing of the pitch bearing assembly of FIG. 3 in accordance with embodiments.
Figure 5:
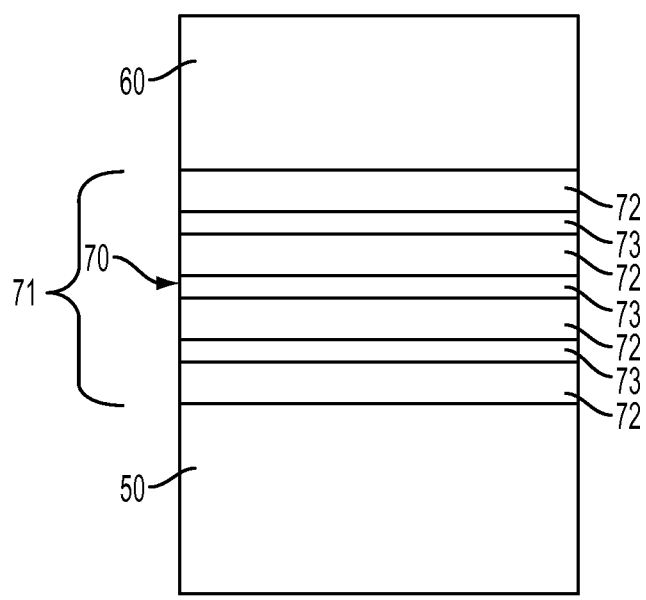
FIG. 5 is a cross-sectional view of stabilizing and compliant layers of the pitch bearing of FIG. 4 taken along line 4-4 in accordance with embodiments.

With reference to FIGS. 3-5, features of each of the pitch bearing assemblies 30 and of each of the pitch bearings 70 will now be discussed. As shown in FIGS. 3 and 4, the second tapered end 53 of the first article 50 has a first curved outer surface 531 and, as shown in FIG. 4, the second article 60 has a second curved outer surface 611 opposite the first curved outer surface 531 at the central portion of the body 61. Due to the respective curvatures of the first and second curved outer surfaces 531 and 611, the first and second curved outer surfaces 531 and 611 define at least respective focal points 532, 612 at an exterior of at least the first article 50 and within an axial span of the second article 60, as shown in FIG. 4.

While described as focal points, it is understood that the defined points can be areas as opposed to thin points, as shown. This would be the case where for example the surfaces 531, 611 have varying radii of curvature.

That is, with increasing radial distance from the center of rotation of the main rotor blades 15 and 16, the second tapered end 53 gradually forms an annular shape as shown in FIG. 3 and geometrically decreases in diameter. This geometric diametric decrease slows until a minimum diameter of the second tapered end 53 is reached at the neck portion 533. From the neck portion 533, the diameter of the second tapered end 53 geometrically increases toward the distal end 534 such that the distal end 534 is flared radially outwardly. A distal side 613 of the second article 60 is generally coplanar with the distal end 534 and a curvature of the second curved outer surface 611 complements a curvature of the first curved outer surface 531. At least the outward flaring of the distal end 534 serves to support the pitch bearing 70 in opposition to centrifugal forces applied to the pitch bearing assemblies 30 when the main rotor blades 15 and 16 rotate. The annularity of the second tapered end 53 and the corresponding annularity of both the central portion of the body 61 and the pitch bearing 70 provide the second article 60 with a degree of freedom to rotate about the second tapered end 53 in accordance with the pitching of the corresponding blade.

In accordance with some embodiments, the respective curvatures of the first and second curved outer surfaces 531 and 611 are substantially similar. In accordance with further embodiments, the respective curvatures of the first and second curved outer surfaces 534 and 611 are partially curved or in some cases spherical.

The pitch bearing 70 is interposed between the first curved outer surface 531 and the second curved outer surface 611 and includes an axisymmetric structure 71 (see FIG. 5). The axisymmetric structure 71 includes compliant layers 72 that may be formed of organic or inorganic elastomeric material, such as rubber, or another similar material and stabilizing layers 73 that are interleaved between the compliant layers 72. The stabilizing layers 73 may be formed of metallic materials, such as metals or metallic alloys, or ceramic material. As a general matter a shear stiffness of the materials of each of the compliant layers 72 may be less than a shear stiffness of the materials of each of the stabilizing layers 73. Although the pitch bearing 70 is illustrated in FIGS. 3-5 as having four compliant layers 72 and three stabilizing layers 73, it is to be understood that more or less layers may be provided. For purposes of clarity and brevity, however, the illustrated 4/3 embodiment will be discussed herein.

It will be understood that each compliant layer 72 may be formed of the same material or of a unique material. In the former case, the use of a single compliant material may provide the pitch bearing 70 with certain characteristic properties associated with the single compliant material. In the latter case, the use of multiple compliant materials may provide the pitch bearing 70 with a cocktail of characteristic properties associated with each of the multiple compliant materials. It will be further understood that each stabilizing layer 73 may be formed of the same material or of a unique material. In the former case, the use of a single stabilizing material may provide the pitch bearing 70 with certain characteristic properties associated with the single stabilizing material. In the latter case, the use of multiple stabilizing materials may provide the pitch bearing 70 with a cocktail of characteristic properties associated with each of the multiple stabilizing materials. In accordance with each embodiment, as noted above, the single compliant material and the multiple compliant materials may include organic or inorganic elastomeric materials and the single stabilizing material and the multiple stabilizing materials may include metals or metallic alloys.

For the embodiments illustrated in FIGS. 3-5, the compliant layers 72 and the stabilizing layers 73 that are proximate to the first curved outer surface 531 of the first article 50 have respective curvatures substantially matching the curvature of the first curved outer surface 531. Similarly, the compliant layers 72 and the stabilizing layers 73 that are proximate to the second curved outer surface 611 of the second article 60 have respective curvatures substantially matching the curvature of the second curved outer surface 611. Thus, in the case where the respective curvatures of the first and second outer surfaces 531 and 611 are complementary, each of the compliant layers 72 and each of the stabilizing layers 73 have similar curvatures. However, it is understood that first outer surface 531 can be not entirely matching second outer surface 611. In the particular case where the respective curvatures of the first and second outer surfaces 531 and 611 are partially spherical, each of the compliant layers 72 and each of the stabilizing layers 73 have partially spherical curvatures. In any case, it will be understood that an axial end 74 of the axisymmetric structure 71 that is associated with the distal end 534 of the first article 50 is flared radially outwardly and that an axial midpoint 75 of the axisymmetric structure 71 is associated with the neck portion 533 and protrudes radially inwardly.

Figure 6:
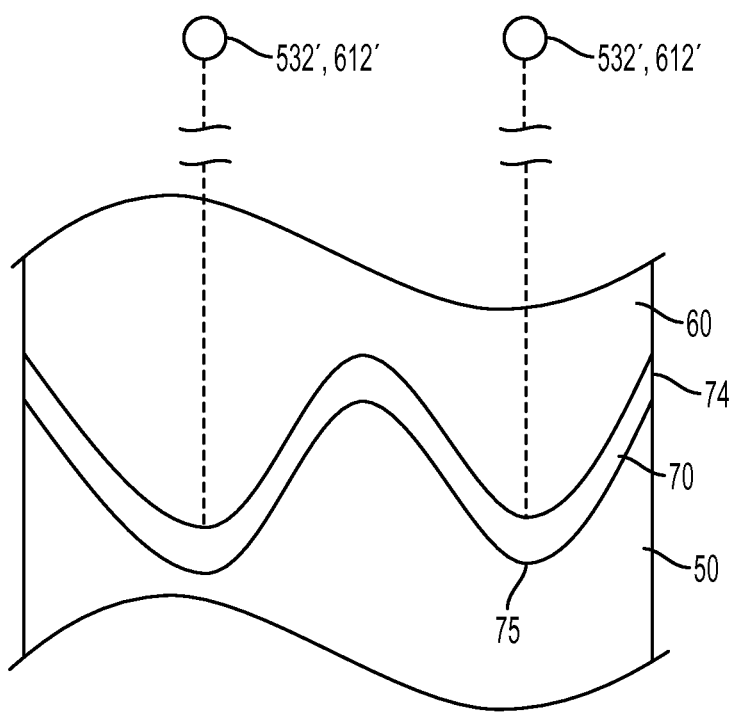
FIG. 6 is a schematic view of a pitch bearing in accordance with further embodiments.

With reference to FIG. 6 and, in accordance with further embodiments, the respective curvatures of the first and second curved outer surfaces 531 and 611 may be formed to define multiple focal points 532', 612'. In these cases, the overall structure of the pitch bearing 70 is similar to what has been described above. That is, regardless of the shape of the first and second curved outer surfaces 531 and 611, the first article 50 will have a neck portion 533 and a distal end 534 that flares radially outwardly and the axisymmetric structure 71 will have an axial end 74 that is flared radially outwardly and at least one axial midpoint 75 that protrudes radially inwardly.

While shown with focal points 532 and 612 external to the first article 50, it is understood that the curvature can be in the opposite direction in other aspects.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, while described in the context of a pitch bearing for first and second articles, it is understood that other uses and applications will be consistent with the disclosures described above. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A pitch bearing assembly comprising:
   a first article including a unitary body having a first end and a second end, at least one of the first end and the second end having a solid cross-section, the at least one of the first end and the second end including a convex curved outer surface extending along a longitudinal axis of the first article;
   a second article including a body portion having a first leg including a first distal end and a second leg including a second distal end, the first and second legs being integrally formed with and extending radially outwardly of the body portion, the body portion including a central passage defining a concave curved inner surface, the central passage being receptive of at least one of the first end and the second end of the unitary body; and
   a pitch bearing operatively connects the first article and the second article, the pitch bearing comprising:
   an axisymmetric structure interposed between the convex curved outer surface of the first article and the concave curved inner surface of the second article, the axisymmetric structure having a cylindrical shape with a curvature extending along the longitudinal axis and including compliant layers and stabilizing layers interleaved between the compliant layers, wherein the curvature is convex relative to the longitudinal axis,
   the compliant layers and the stabilizing layers proximate to the first article have a curvature matching that of the convex curved outer surface of the first article,
   the compliant layers and the stabilizing layers proximate to the second article have a curvature matching that of the concave curved inner surface of the second article, and
   a shear stiffness of each of the stabilizing layers is greater than a shear stiffness of each of the compliant layers.

2. The pitch bearing assembly according to claim 1, wherein respective curvatures of the convex curved outer surface of the first article and the concave curved inner surface of the second article are complementary.

3. The pitch bearing assembly according to claim 2, wherein each of the compliant layers and each of the stabilizing layers have similar curvatures.

4. The pitch bearing assembly according to claim 1, wherein focal points respectively defined by the convex curved outer surface of the first article and the concave curved inner surface of the second article are within an axial span of the second article.

5. The pitch bearing assembly according to claim 1, wherein the curvature of the axisymmetric structure extends smoothly and continuously along an entire axial length of the axisymmetric structure and an axial end of the axisymmetric structure is flared outwardly and an axial midpoint of the axisymmetric structure protrudes inwardly.

6. The pitch bearing assembly according to claim 1, wherein respective curvatures of the convex curved outer surface of the first article and the concave curved inner surface of the second article are spherical.

7. The pitch bearing assembly according to claim 6, wherein the respective curvatures of each of the compliant layers and each of the stabilizing layers are spherical.

8. The pitch bearing according to claim 1, wherein each of the compliant layers comprises rubber.

9. The pitch bearing according to claim 1, wherein the compliant layers and the stabilizing layers have a curvature matching that of the first and second curved outer surfaces.

10. A pitch bearing assembly, comprising:
    a first unitary article including a first end and a second end, the first article being rotatable with the first end proximate and operatively coupled to a center of rotation and having a first longitudinal axis and an outer surface extending along the first longitudinal axis with a convex cylindrical shape at the second end extending along a longitudinal axis of the first article;
    a second article configured to be attached to the second end of the first article, the second article having a first leg including a first distal end and a second leg including a second distal ends extending radially outwardly of a body having a central passage extending along a second longitudinal axis, the central passage including an inner surface extending along the second longitudinal axis with a concave cylindrical shape;
    a torque tube operatively coupled to the center of rotation and to the second article at distal ends of the second article; and
    a convex cylindrical axisymmetric structure interposed between the outer surface of the first unitary article and the inner surface of the second unitary article and including compliant layers and stabilizing layers interleaved between the compliant layers,
    the compliant layers and the stabilizing layers have respective curvatures matching that of the outer surface of the first unitary article and the inner surface of the second unitary article, and
    a shear stiffness of each of the stabilizing layers is greater than a shear stiffness of each of the compliant layers.

11. The pitch bearing assembly according to claim 10, wherein the first article comprises high strength steel and the second article comprises titanium.

12. The pitch bearing assembly according to claim 10, wherein the second article is configured for attachment to a component of a rotormachine rotor blade.

13. The pitch bearing assembly according to claim 10, wherein each of the compliant layers and each of the stabilizing layers have similar curvatures.

14. The pitch bearing assembly according to claim 10, wherein focal points respectively defined by the outer surface of the first unitary article and the inner surface of the second unitary article are within an axial span of the second article.

15. The pitch bearing assembly according to claim 10, wherein a curvature of the axisymmetric structure extends smoothly and continuously along an entire axial length of the axisymmetric structure and an axial end of the axisymmetric structure is flared outwardly and an axial midpoint of the axisymmetric structure protrudes inwardly.

16. The pitch bearing assembly according to claim 10, wherein respective curvatures of the outer surface of the first unitary article and the inner surface of the second unitary article are spherical.

17. The pitch bearing assembly according to claim 16, wherein the respective curvatures of each of the compliant layers and each of the stabilizing layers are spherical.

18. A pitch bearing assembly, comprising:
a first unitary article including first and second ends, the first article being rotatable with the first end proximate and operatively coupled to a center of rotation and having a first curved outer surface at the second end extending along a longitudinal axis of the first article;
a second article including a first leg having a first distal end and a second leg including a second distal end extending radially outwardly of a body having a central passage, the second article being configured to be attached with coaxial overlap to the second end of the first article, the central passage having a curved inner surface;
a torque tube operatively coupled to the center of rotation and to the second article at distal ends of the second article; and
an axisymmetric structure interposed between the outer surface of the first article and the inner surface of the second article and including compliant layers and stabilizing layers interleaved between the compliant layers,
the compliant layers and the stabilizing layers have respective curvatures matching that of the outer surface of the first article and the inner surface of the second article, and
a shear stiffness of each of the stabilizing layers is greater than a shear stiffness of each of the compliant layers, wherein the respective curvatures of the outer surface of the first article and the inner surface of the second article define multiple focal points with outwardly flaring ends, the multiple focal points being arranged in a linear formation defined to extend linearly along a longitudinal axis along which the first and second articles coaxially overlap.

19. The pitch bearing assembly according to claim 10, wherein each of the compliant layers comprises rubber.

* * * * *